(12) United States Patent
Srivastava et al.

(10) Patent No.: US 10,054,912 B2
(45) Date of Patent: Aug. 21, 2018

(54) METHOD AND APPARATUS FOR AUTO SYNCHRONIZING CONTROL SYSTEM DATA STRUCTURES WITH MODEL COMPOSITION

(71) Applicant: General Electric Company, Schenectady, NY (US)

(72) Inventors: Ayush Srivastava, Hyderabad (IN); Nagesh Laxminarayana Kurella, Hyderabad (IN); Abhik Banerjee, Hyderabad (IN); Pavan Kumar Singh Thakur, Hyderabad (IN); Siva Gundeboina, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 317 days.

(21) Appl. No.: 14/886,849

(22) Filed: Oct. 19, 2015

(65) Prior Publication Data

US 2017/0108835 A1    Apr. 20, 2017

(51) Int. Cl.
*G06F 17/30* (2006.01)
*G05B 13/04* (2006.01)
*G05B 15/02* (2006.01)
*G05B 19/418* (2006.01)

(52) U.S. Cl.
CPC .............. *G05B 13/04* (2013.01); *G05B 15/02* (2013.01); *G05B 19/4186* (2013.01); *G06F 17/30569* (2013.01); *G05B 2219/31369* (2013.01)

(58) Field of Classification Search
None
See application file for complete search history.

(56) References Cited

U.S. PATENT DOCUMENTS

| 7,908,598 | B2  | 3/2011  | Betts et al. |
| 8,132,225 | B2* | 3/2012  | Chand ................... H04L 63/10 726/1 |
| 8,612,200 | B2  | 12/2013 | Wang et al. |
| 8,826,255 | B1* | 9/2014  | Avadhanula ............ G06F 8/433 717/154 |

(Continued)

FOREIGN PATENT DOCUMENTS

| EP | 1903411 A1 | 3/2008 |
| EP | 2908196 A1 | 8/2015 |

OTHER PUBLICATIONS

Popovics et al. "Automatic Simulation Model Generation Based on PLC Codes and MES Stored Data", 45th CIRP Conference on Manufacturing Systems, vol. No. 03 pp. 67-72, 2012.

(Continued)

*Primary Examiner* — Hung Le
(74) *Attorney, Agent, or Firm* — GE Global Patent Operation; Scott R. Stanley (57) ABSTRACT

Systems and methods for generating models of control systems based on the data emitted by the PLCs of the control system are disclosed. It is initially determined if the data of a PLC is structured data or unstructured data. If the data emitted by the PLC is structured data, a model of the control system is automatically generated based on the structured data from the PLC. If the data is unstructured data, information regarding the assets in the control system is obtained from another data source other than the PLC and a model of the control system is generated based on the received information and the data.

20 Claims, 9 Drawing Sheets

(56) References Cited

U.S. PATENT DOCUMENTS

| | | | |
|---|---|---|---|
| 9,367,055 B2* | 6/2016 | Ji | G05B 19/056 |
| 2005/0085928 A1* | 4/2005 | Shani | G05B 19/056 |
| | | | 700/18 |
| 2006/0074917 A1* | 4/2006 | Chand | H04L 63/10 |
| 2009/0089700 A1* | 4/2009 | Gu | G05B 19/41885 |
| | | | 715/771 |
| 2012/0083919 A1* | 4/2012 | Maturana | G05B 23/0251 |
| | | | 700/211 |
| 2012/0316688 A1* | 12/2012 | Boardman | H02J 13/0079 |
| | | | 700/291 |
| 2012/0316697 A1* | 12/2012 | Boardman | H02J 13/0079 |
| | | | 700/297 |
| 2013/0131840 A1* | 5/2013 | Govindaraj | G05B 19/41865 |
| | | | 700/19 |
| 2014/0223342 A1 | 8/2014 | Hood et al. | |
| 2015/0134733 A1* | 5/2015 | Maturana | H04L 43/04 |
| | | | 709/203 |
| 2015/0242548 A1* | 8/2015 | Jones | G06F 17/5022 |
| | | | 703/21 |
| 2017/0140040 A1* | 5/2017 | Gottemukkala | G06Q 10/067 |

OTHER PUBLICATIONS

European Search Report and Opinion issued in connection with corresponding EP Application No. 16194220.6 dated Dec. 20, 2016.

* cited by examiner

METHOD AND APPARATUS FOR AUTO SYNCHRONIZING CONTROL SYSTEM DATA STRUCTURES WITH MODEL COMPOSITION

TECHNICAL FIELD

The present disclosure relates to apparatus and methods for generating models from PLC (Programmable Logic Controller) structure.

BACKGROUND

Modern industrial control systems have enabled factories and plants with machinery to become partly or wholly automated. The various processes, assets, parameters, alarms of a plant can be monitored and controlled via the use programmable logic controllers (PLCs) that are coupled to the machinery. PLCs can be controlled via higher level systems which can comprise graphical interfaces such as, HMI (Human Machine Interface). Traditionally PLCs have had limited ability to store and process data structures so that values stored in the memory of the PLC are free floating and do not include context information. Improvements in this area have led to the development of protocols, such as, OLE for Process Control Unified Architecture (OPC UA). Plants can include legacy control systems that have PLCs which store unstructured data that does not comply with the latest protocols and hence does not include context information. Other control systems can have PLCs that are protocol-compliant and are therefore configured to store structured data that includes context information. Accordingly, different software applications for handling structured and unstructured data in a PLC need to be developed in such environments.

SUMMARY

This disclosure relates to generating models for assets in a control system based on structured and unstructured data emitted by the PLCs of a control system. The model comprising the assets, asset groups, asset parameters or attributes and their relationships are defined once during the configuration. Any changes to the control system when included in the models can be automatically distributed to other parts or applications of the control system such as the SCADA (supervisory control and data acquisition) or the HMI. Hence, the need for configuring the assets each time there is a change in the control system application logic can be minimized.

In some embodiments a method of generating asset models by a computing device is disclosed. The method comprises accessing, by the computing device, data stored in a PLC wherein the data is associated with one or more assets of a control system comprising the PLC. The data comprises a plurality of data elements. The method comprises determining, by the computing device, if the data is structured data or unstructured data. A model of the control system is automatically generated by the computing device based on the data if the data is structured data. If the data is unstructured data, the method comprises receiving, by the computing device, information regarding an asset of the one or more assets associated with each of the data elements and generating, by the computing device, a model of the control system based on the received asset information and the data.

A computing device comprising a processor and a storage medium for tangibly storing thereon program logic executable by the processor is disclosed in some embodiments. In some embodiments, the program logic comprises data accessing logic that accesses data stored in a PLC wherein the data is associated with one or more assets of a control system comprising the PLC. The data comprises a plurality of data elements and the program logic further comprises determining logic that determines if the data is structured data or unstructured data. Receiving logic comprised in the program logic receives information regarding an asset of the one or more assets associated with each of the data elements if the data is unstructured data. In some embodiments, model generating logic comprised in the computing device automatically generates a model of the control system based on the data if the data is structured data, and generates a model of the control system based on the received asset information and the data if the data is unstructured data.

A non-transitory computer-readable storage medium, comprising instructions for generating models of control systems is disclosed in one embodiment. The instructions comprise instructions for accessing data stored in a PLC wherein the data is associated with one or more assets of a control system comprising the PLC and the data comprises a plurality of data elements. The computer-readable storage medium also comprises instructions for determining if the data is structured data or unstructured data and instructions for automatically generating a model of the control system based on the data if the data is structured data. The computer-readable storage medium also comprises further instructions for receiving information regarding an asset of the one or more assets that is associated with each of the data elements and generating a model of the control system based on the received asset information and the data if the data is unstructured data.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be stored in a computer readable storage medium and provided to a processor of a general purpose computer, special purpose computer, ASIC, or other programmable data processing apparatus, such that the instructions or logic, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

PLCs used in the automation industry are communicatively coupled to the various sensors, motors and other machinery from which they a can receive and store data. A PLC stores control logic in its memory along with signals generated by the devices that it monitors. The PLC can be accessed by other computing devices to read out the signals. Generally a current value of a signal is stored in a PLC with its signal name and a memory address on the PLC where it is stored. In legacy control system world, the application engineer develops the control logic, models the assets and asset groups that are being controlled by the PLC. However, one of drawbacks of this approach is that there is no interface between the data that has been downloaded to the PLC and the asset models developed by the engineer. There is no mechanism through which the assets and/or processes that are to be monitored and controlled by the PLC are made visible and information is made available through the model development.

Embodiments are described herein that provide visibility to the information stored in the PLC through the model design and implementation phase. In the embodiments described herein, the control logic that has been developed and downloaded into the PLC is used to (a) build the model that encompasses the asset and the asset group that is monitored and controlled by the PLC and (b) build relationship between these assets and processes that are performed on the assets. In some embodiments, systems and methods are provided that enable reading the PLC data structure and depending on whether the data emitted by the PLC is structured or unstructured, employing different methods for generating a model of a plant with information regarding its assets and their properties. If the data is structured data, automatic generation of the model is enabled in some embodiments. In some embodiments, user input can be required to associate PLC data with asset models if the PLC emits unstructured data.

Figure 1:
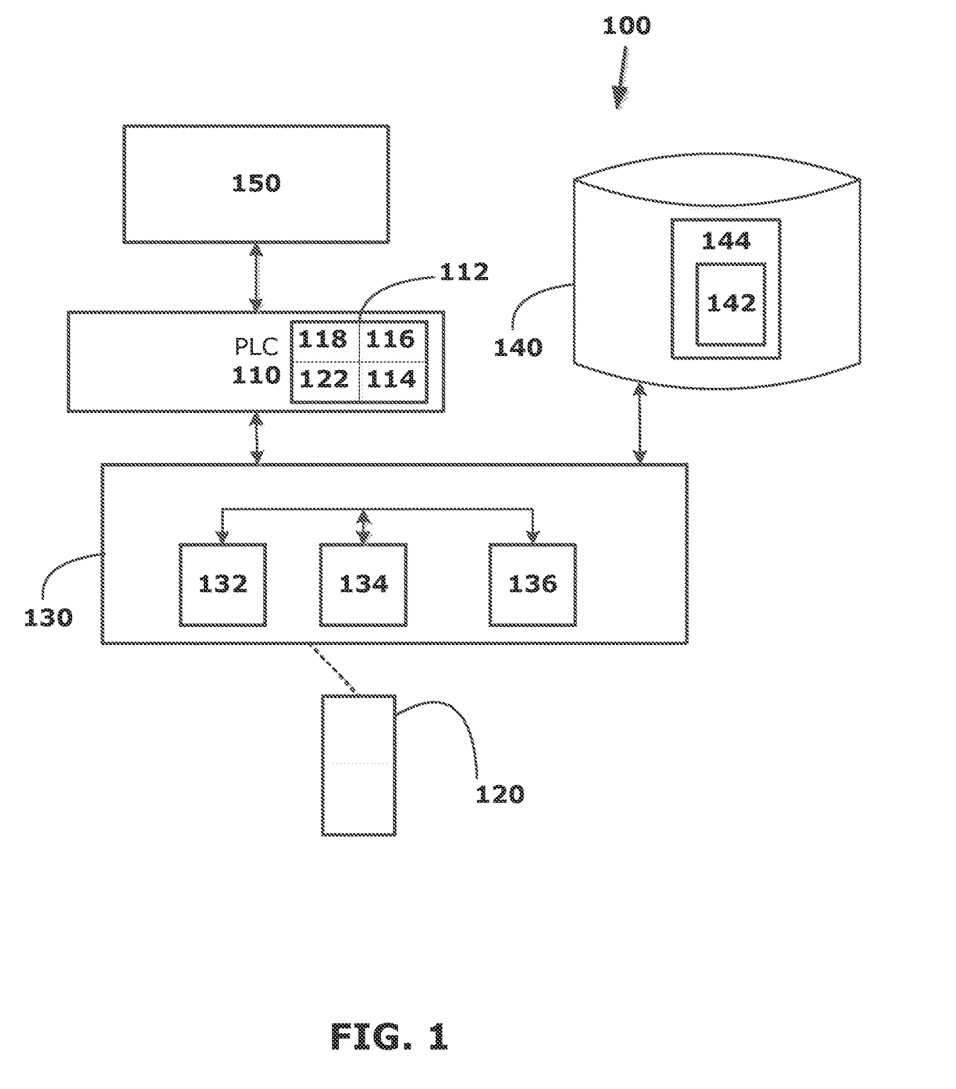
FIG. 1 is a schematic diagram of an apparatus that can be employed for generating models of assets in accordance with some embodiments described herein.

FIG. 1 is a schematic diagram 100 of an apparatus that can be employed for generating models of assets in accordance with some embodiments described herein. A PLC 110 is communicatively coupled to and controlling machinery of a control system, for example, a water treatment plant 150. The PLC 110 comprises data 112 that is received from the various pieces of machinery of the control system 150. The PLC 110 can be used to control assets such as motors, valves, pumps, tanks, pipes and other filtration and purification equipment within the control system 150. Accordingly, the data 112 comprises a plurality of data elements 114, 116, 118 and 122. Each of the data elements 114, 116, 118 and 122 is associated with a respective one of the various assets that are monitored by the PLC 110 and is stored in its respective memory element on the PLC 110.

In some embodiments, the data 112 can be structured data. For structured data, each of the data elements 114, 116, 118 and 122, can comprise a plurality of data components such as the signal name, its memory address, a current value and information regarding its source or the asset generating the signal. By the way of illustration and not limitation, a data element such as "Motor.Speed.CurrentValue,0X0010" comprises at least four data components that include information regarding the source (i.e., "Motor"), the signal name (i.e., "Speed"), a current value of the signal (i.e., "Current Value") and the memory address (i.e., "0X0010"). Such data which includes context information pertaining to the source of the signal comprises structured data. In some embodiments, the data 112 can be unstructured data that comprises only the signal name and its memory address but does not comprise contextual information regarding its source. By the way of illustration and not limitation, a value such as "Speed.CurrentValue,0X0010" comprises data components with information regarding only the signal name, its current value and the memory address but does not comprise the source information. Such data which does not include context information pertaining to the source of the signal comprises unstructured data.

The data 112 can be accessed by a model configuration module 130 stored and executed by the computing device 120 for generating a model that represents assets associated with the system controlled by the PLC 110, such as the water treatment plant 150. In some embodiments, the computing device 120 can be disparate from the PLC 110 and comprises general-purpose processors. It can store application modules such as an application configuration module 130 in its non-volatile memory which are executed by the processors. The model configuration module 130 interacts with the PLC 110 in order to read the PLC 110 data structures and use the information to develop models for the control system 150.

A data access module 132 is comprised in the model configuration module 130 to access the data 112 from the PLC for the generation of the model. In some embodiments, the data access module 122 can be enabled with the Internet Gateway Server (IGS) for example. The data access module 132 therefore employs IGS to read the data structures comprising data elements 114, 116, 118 and 122 from the PLC 110. The data 112 read by the model configuration module 130 can be one of a structured data or unstructured data. Based on the data 112 being a structured data or unstructured data, a model generation module 134 can generate models representing the assets of the control system for the water treatment plant 150. In some embodiments, based on the tokens generated by parsing the data 112, the model generation module 134 can determine if the data is structured or unstructured. In some embodiments, the model generation module 134 can be preconfigured to receive one of a structured data or unstructured data based on the identity of the PLC 110 being accessed.

If the data 112 is structured data, the model generation module 134 can be configured to parse the data and automatically generate models 142 of the assets specified in the structured data as will be described further herein. If the data is unstructured data, the model generation module 134 can be configured to prompt a user to provide the asset information to be associated with the signals in particular memory locations. Upon receiving the asset information from the user, the model generation module 134 can be configured to generate the models 142 corresponding to the assets from the unstructured data. The models thus generated can be stored by the output module 136 to a database 140 couple to the computing device 120.

In some embodiments, the database 140 can be a database in the same locale as the plant 150. In some embodiments, the database 140 can be a cloud database wherein multiple plants can access the model information stored therein. In some embodiments, the output module 136 can store an output file 144 of different formats such as but not limited to a JSON (JavaScript Object Notation) file or an XML (Extensible Markup Language) format, csv (comma separated values) format or other formats that comprise the various details of the model 142 that was generated. In some embodiments, the output file 144 can comprise details regarding the assets, asset groups, asset parameters and their interrelationships. Higher layers of software applications such as HMIs can consume the details of the model 142 from the output file 144 rather than access the data 112 directly from the PLC 110.

The models 142 generated in accordance with embodiments herein provide a hierarchical arrangement of otherwise free-floating data 112 comprised in the PLC 110. This can greatly improve efficiency of the control system 150 for the entire water treatment plant. For example, a software application such as HMI of the control system may need to make multiple access requests to the PLC 110 to access multiple attributes of a single asset. When using the models 142, the HMI can access all the attributes of the asset via a single access request to the asset model in the database 140. This mitigates the need for the HMI to make multiple calls to the PLC 110 to access different signal values regarding the same asset. Moreover, any changes to the assets of the control system 150, such as but not limited to addition or deletion of assets, can be mapped to the models 142 in order to be accessible to the various software layers built to interact with the PLC 110. This minimizes the need for the developers to retool the various software layers individually in response to the changes to the control system 150.

Although the model configuration tool 130 is shown as being executed by a computing device 120 disparate from the PLC 110, it can be appreciated that this is only for simplicity of illustration and that a single computing device can include the PLC 110 and a disparate general-purpose processor(s) for executing the model configuration tool 130. It can be appreciated that only one PLC is shown for ease of illustration. Data from multiple PLCs controlling different assets in a control system wherein a subset of the PLCs emit structured data while the others emit unstructured data can also be processed for generation of asset models 142 in accordance with embodiments described herein.

Figure 2:
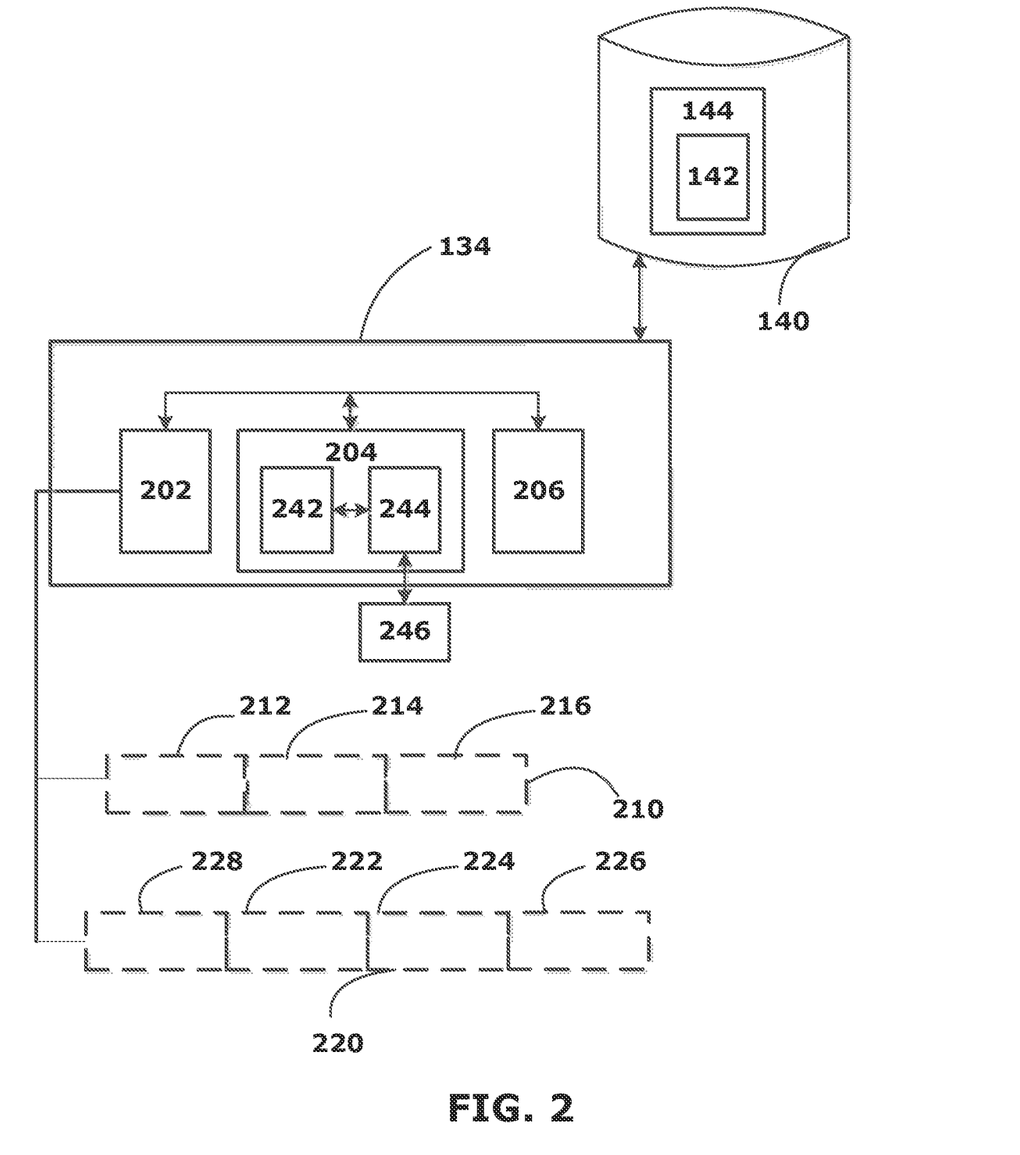
FIG. 2 is a schematic diagram of the model generation module in accordance with some embodiments.

FIG. 2 is a schematic diagram of the model generation module 134 in accordance with some embodiments. The model generation module 134 further comprises a data parsing module 202, an asset identification module 204 and an asset generation module 206. The data parsing module 202 accesses the plurality of data elements 114, 116, 118 and 122 from the PLC 110 and parses them in order to obtain the various data components in each of the data elements 114, 116, 118 and 122. Known data parsing techniques can be employed by the data parsing module 202 to obtain the information. Parsing a data element 210 of unstructured data can provide data components such as the signal name 212 and the memory address 214 within the PLC 110 memory where the signal name is stored in addition to its current value 216 of the signal. Parsing a data element 220 of structured data can provide not only the data components such as the signal name 222, its current value 224 and the memory address 226 within the PLC 110 memory where the signal name is stored but also context information that includes the source 228 of the signal.

Based at least on the information obtained from the data parsing module 202, the model generation module 134 can determine if the data 112 in the PLC 110 is structured data or unstructured data. Alternatively, the information regarding whether the data 112 is structured or unstructured can be provided to the model generation module 134 based on the type of PLC 110 being employed in the control system 150. If the data 112 is structured data, the asset identification module 204 determines the source of the signals from the data 112 without requiring any external user input. As the information regarding the signal sources is known from the structured data, the source identification module 204 can further automatically determine not only the assets but also attributes of the assets such as but not limited to the asset states, properties, tags associated with each of the assets and the like from the structured data.

The information regarding each of the assets thus received by the asset generation module 206 is used to automatically generate models 142 of the assets. In some embodiments, the asset identification module 204 can comprise an asset information receiving module 242 that can be configured to receive asset information from various sources. The asset information receiving module 242 can be configured to automatically identify information regarding various assets such as but not limited to tags, 10 properties and the like to a particular asset model. By employing the asset name such as "Motor", all signals emitted by the source "Motor" can be identified and the attribute information of the "Motor" asset can be obtained from the signal names. For example, an attribute such as "Speed" of the "Motor" asset can be obtained from the structured data and its data type from the memory location included in the structured data. Similarly, other data items, for example, rpm (rotations per minute) associated with the "Motor" can be identified as attributes of the "Motor" asset. Accordingly, the asset information receiving module 242 can aggregate the attributes of the "Motor" asset from the structured data to automatically generate a model of the "Motor" asset. The details regarding the model can be stored on the database 140. In some embodiments, the model details can be included in an output file 144.

If the data 112 is unstructured data, only the signal name, its current value and the memory address in which the signal is stored on the PLC 110 are included and no source information is available. Therefore, models 142 of the control system 150 assets that are to be monitored need to be initially generated. In some embodiments, the asset information receiving module 242 that can be configured to receive asset information from sources other than the data 112 in the PLC 110. In some embodiments, the asset information receiving module 242 can be communicatively coupled to a user module 244. The user module 244 prompts a user to input model information regarding the assets that is generated prior to accessing the unstructured data. The user further identifies information from the unstructured data such as the properties and IO (Input Output) tags that need to be associated with each of the assets that has been generated. For example, the information regarding the models that was previously generated can be uploaded in a model file 246 such as an XML (eXtensible Markup Language) file by the user to the user module 244. The asset information receiving module 242 receives the model file 246 and coordinates signal names from the unstructured data with the information in the model file to identify an asset generating each of the signals. In some embodiments, the asset information provided to the asset information receiving module 242 further comprises an image to be associated with the asset model.

Figure 3:
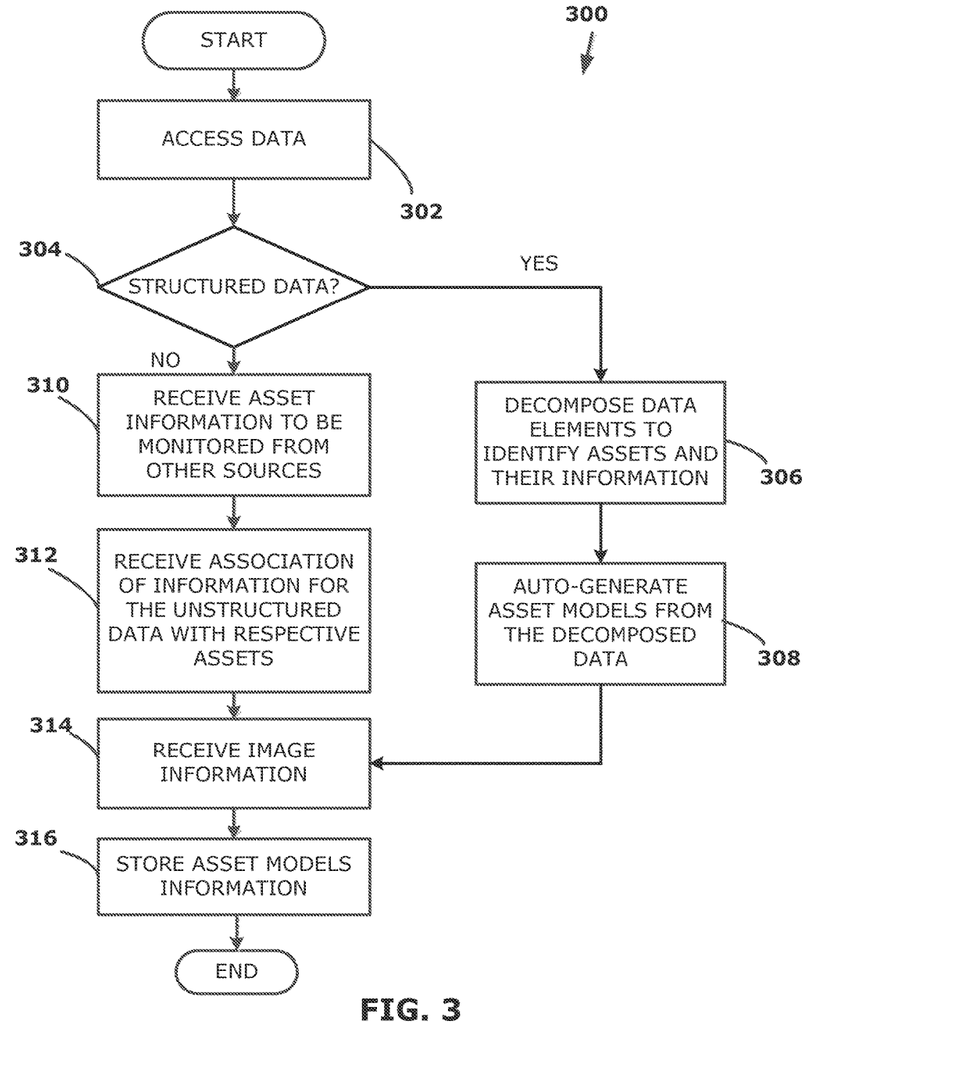
FIG. 3 is a flowchart that details a method of generating asset models in accordance with some embodiments described herein.

FIG. 3 is a flowchart 300 that details a method of generating asset models in accordance with some embodiments described herein. The method begins at 302 wherein data 112 from the PLC 110 is accessed. Although only one PLC 110 is shown in the diagrams, this is only by the way of illustration and not limitation. It can be appreciated that the control system 150 can comprise a plurality of PLCs not all of which need to conform to standard protocols. Accordingly, data from a subset of the control system PLCs accessed by the model configuration module 130 can be structured data while unstructured data is received from another subset of PLCs in the control system 150. Models for assets monitored by the PLCs emitting structured data and unstructured data can be generated in accordance with methods described herein by employing apparatus described above.

At 304, it is determined if the data 112 is structured data. In some embodiments, the step 304 for determining if the data is structured or unstructured can be redundant as certain PLCs can be configured to be compliant with certain data protocols and thus automatically store structured data. Accordingly, the model configuration module 130 can be preconfigured to receive one of structured or unstructured data based on identification of the particular PLCs in the control system 150 storing structured or unstructured data. Each element of the structured data can comprise not only the signal name and a memory address at which the signal is stored on the PLC 110 memory but also information regarding the source of the signal. Data elements from unstructured data, on the other hand, comprise signal name and the memory address but do not comprise the source information of the signal.

If a data element comprises signal source information, it is determined at 304 that the data is structured data and accordingly, at 306, the data elements in the structured data are decomposed to identify the information regarding the assets monitored and controlled by the PLC 110. For example, signal information stored in a data element such as, "Motor.Speed.CurrentValue,0X0010" can be decomposed to identify that data components such as a speed signal generated by the Motor asset whose Current Value is stored at the memory location '0X0010' on the PLC 110. Therefore, a model for the motor asset is automatically generated at 308. An attribute named 'speed' and having datatype as indicated by the Current Value is also generated and associated with the motor asset class. The method then proceeds to 314 wherein information regarding an image to be associated with the asset model is received. The asset model along with its attributes and associated image is stored at 316.

If it is determined at 304 that the data does not comprise source information, it is classified as unstructured data. Therefore, the information regarding the asset associated with the signal is received at 310 from data sources other than the PLC 110. In some embodiments, a user can be prompted to provide the asset information for association with the signals in unstructured data. By the way of illustration and not limitation, the user can provide a model file 246 comprising information mapping particular assets to respective signals. The association of IO signals and tags from the unstructured data with respective assets can thus be obtained at 312 from the model file 246. In addition, information regarding an image to be associated with the asset model is received at 314. The asset model along with its attributes and associated image are stored at 316. Therefore, asset models can thus be generated from both structured data and unstructured data in accordance with embodiments described herein.

Figure 4:
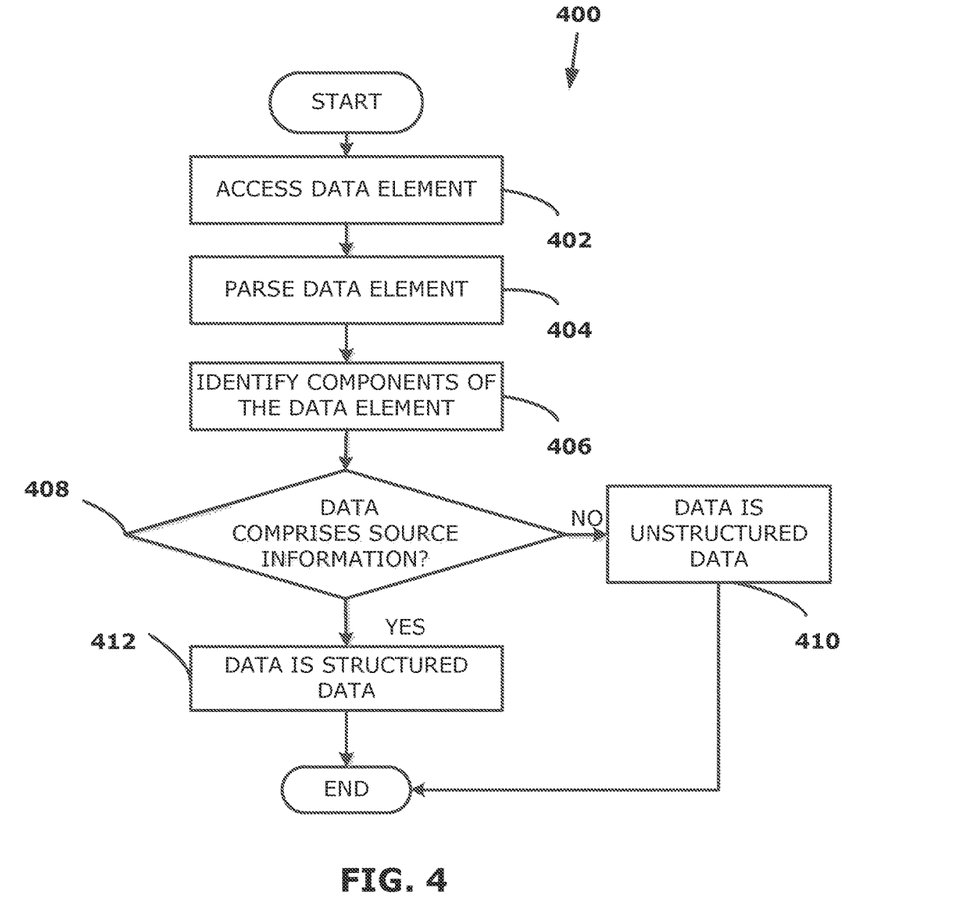
FIG. 4 is a flowchart that details a processor-executable method of differentiating structured data from unstructured data in accordance with some embodiments.

FIG. 4 is a flowchart 400 that details a processor-executable method of differentiating structured data from unstructured data in accordance with some embodiments. The method begins at 402 wherein the data 112 comprising a plurality of data elements 114, 116, 118 and 122 is accessed from the PLC 110 memory. The data is parsed as shown at 404. The various components in the data element 114, 116, 118 and 122 are thus identified upon parsing at 406. Based on the identified data components, it is determined at 408 if the data comprises source information. If it is determined at 408 that the data comprises source information 228, it can be concluded at 412 that the data is structured data. If it is determined at 408 that the data does not comprise source information, it can be determined at 410 that the data is unstructured data.

Figure 5:
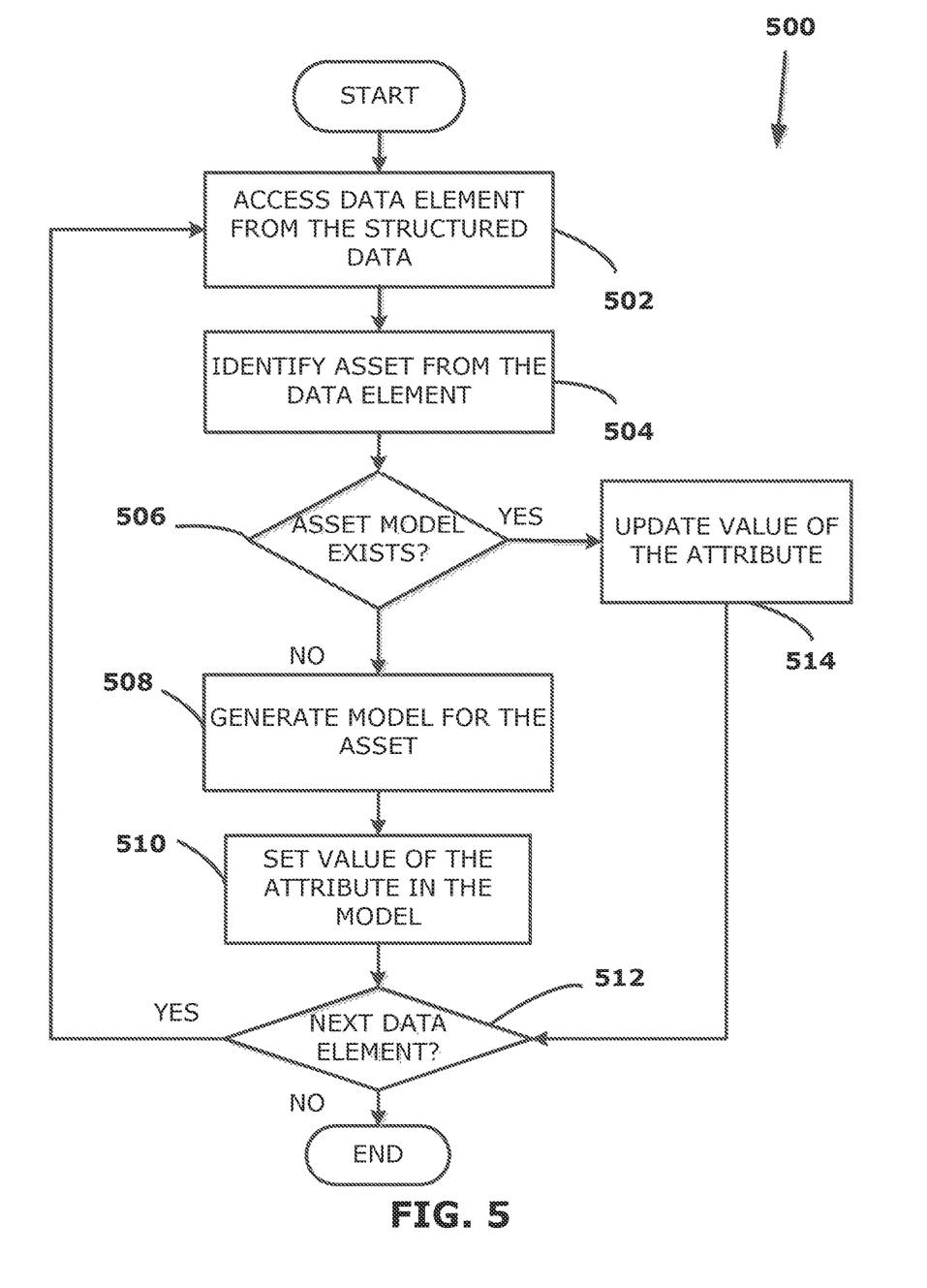
FIG. 5 is a flowchart that details a method of auto-generation of an asset model from structured data in accordance with some embodiments.

FIG. 5 is a flowchart 500 that details a method of auto-generation of an asset model from structured data in accordance with some embodiments. The method begins at 502 wherein a data element, for example, "Motor.Speed.CurrentValue,0X0010" is read or accessed from the structured data stored in a PLC 110. At 504, the asset "Motor" which is the source of the signal in the data element is identified from the data element. In some embodiments, the source "Motor" can represent a real-world motor that is part of the control system 150. At 506, it is determined if a model for "Motor" asset exists in the model representing the control system 150. If it is determined at 506 that a model for the "Motor" does not exist in the control system model, a model of the "Motor" asset is generated at 508 and added to the model representing the control system 150. In some embodiments, the model can comprise an instance that uniquely represents the real-world motor that forms part of the control system 150. In some embodiments, the instance is based on a class which is a logical programmatic structure that models the various attributes and functions of a real-world motor. The various real-world motors in the control system 150 are each represented by a unique instance generated with the motor class as a template. The value of the "Speed" attribute of the "Motor" instance is set to the "Current Value" as retrieved from the memory location 0X0010 from the PLC 110 at 510. The method proceeds to analyze the next data element from the structured data as shown at 512. If at 506, it is determined that an instance for the "Motor" exists in the model for the control system 150, the Speed attribute of the instance representing the "Motor" is updated at 514 to the "Current Value" from the memory location 0X0010 of the PLC 110. The method proceeds to analyze the next data element from the structured data as shown at 512. If no more data elements exist for analysis, the method terminates on the end block.

Figure 6:
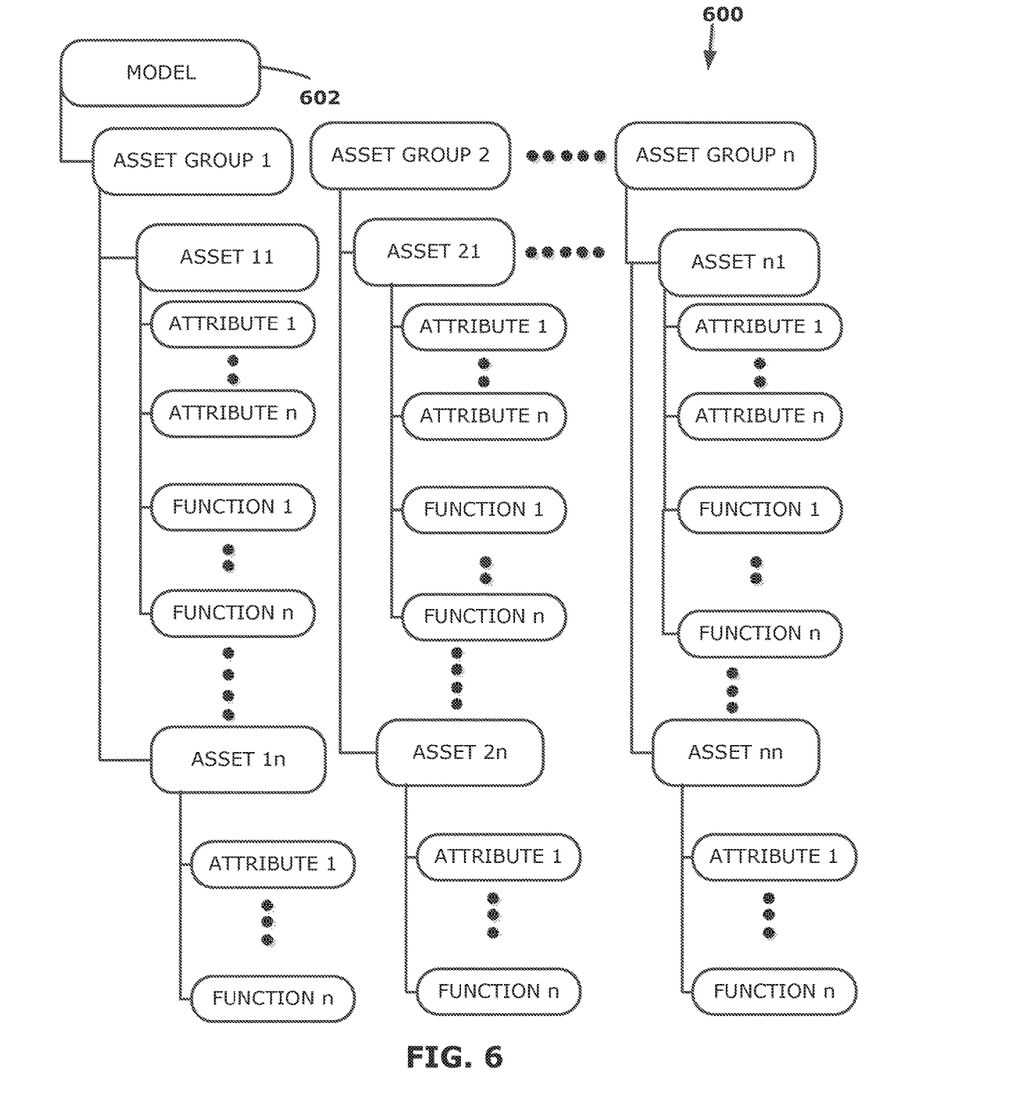
FIG. 6 is a schematic diagram of a model of the control system that is generated in accordance with some embodiments described herein.

FIG. 6 is a schematic diagram 600 of a model 602 of a control system that is generated in accordance with some embodiments described herein. It can be appreciated that the model is described herein only by the way of illustration and not limitation and that other models can be generated in accordance with embodiments described herein. A model 602 of a control system can comprise one or more asset groups. For example, in the model for a water treatment plant associated with the control system 150, each of the motors, pumps, tanks, valves, pipes, sensors and other machinery can form a respective asset group. Accordingly, a plurality of asset groups Asset Group 1, Asset Group 2, . . . , Asset Group n are defined wherein each asset group represents a collection of asset models of a particular type of hardware or machinery. In some embodiments, an asset group can be associated with a base class that forms a template from which instances or sub-classes of various assets are derived. Thus, each asset group such as asset group 1 can comprise n number of different assets such as, Asset 11, Asset 12, . . . , Asset 1n. Each asset can further comprise n number of different attributes, for example, Attribute 1, Attribute 2, . . . , Attribute n along with functions. In some embodiments, the attributes can comprise name-value pairs. In some embodiments, the attributes can represent output of a process executed by the asset. Each of the functions, Function 1, Function 2, . . . Function n etc., models a particular real-world procedure executed by the real-world asset. In some embodiments, a function can provide an output that can be captured and stored in an attribute. In some embodiments, functions of an asset can model interaction of the asset with other assets of the control system 150. It can be appreciated that n number of asset groups, n assets in each group, n number of attributes and n number of functions associated with each asset is shown only by the way of illustration and not limitation and that this number can vary depending on the nature of the asset and the real-world assets associated with the asset group.

Figure 7:
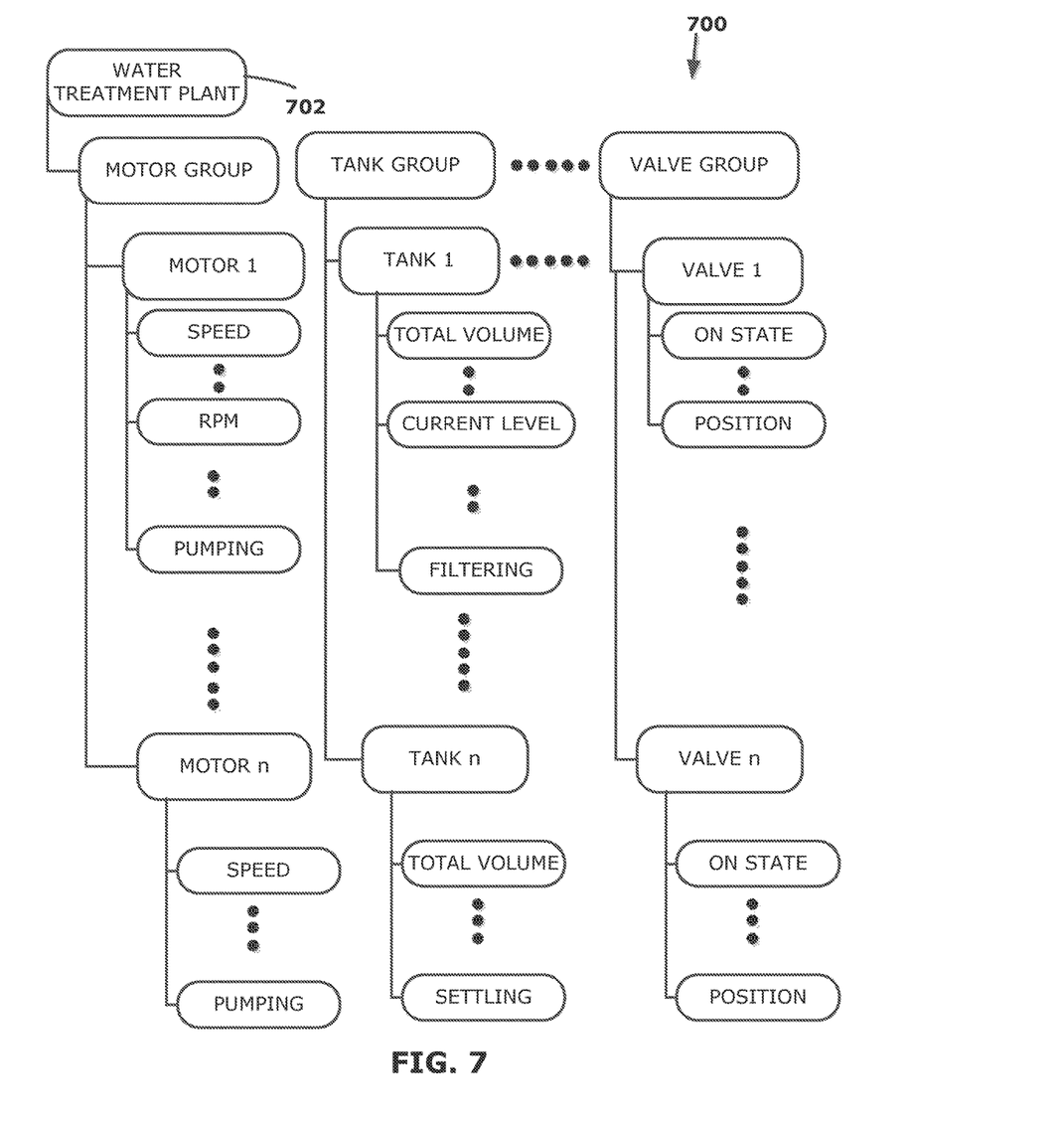
FIG. 7 is a schematic diagram of a model of a control system for a water treatment plant that is generated in accordance with some embodiments described herein.

FIG. 7 is a schematic diagram that shows a brief outline a model 702 for the water treatment plant that is generated in accordance with embodiments described herein. Again, it can be appreciated that the details of the model are discussed herein only by the way of illustration and not limitation. Other models comprising representations of the various hardware components of the water treatment plant 150 can be generated in accordance with embodiments described herein. The model 702 comprises a plurality of asset groups, for example, the motor group, the tank group, the valve group and the like. Each asset representation further comprises one or more attributes and/or functions. Again, n (n being a natural number) members are shown in each of the asset group only by the way of illustration and not limitation. More or less number of members can be included in each asset group depending on the number of real-world assets that are included in the water treatment plant.

The motor group comprises a collection of models such as motor 1, motor 2, . . . motor n, that respectively represent each real-world motor in the water treatment plant. The motor 1 model further comprises attributes such as speed, rpm (rotations-per-minute) and the like. In addition, it comprises functions such as pumping which represent one or more processes executed by the real-world motor.

The tank group comprises a collection of models such as tank 1, tank 2 . . . tank n that respectively represent each real-world tank in the water treatment plant. Tank 1 model comprises attributes such as total volume, current level etc., which describe properties of a real-world tank. Tank 1 further comprises a filtering function which represents the filtering process carried out by the real-world tank. For example, the filtering function can receive value for variables such as input purity of water and output values for current purity which represent the level of filtering occurring in tank 1. It may be noted that tank n has a different function—namely settling. Thus, different instances or models in an asset group can vary slightly in terms of their attributes and functions while primarily being based on an asset class template.

The valve group comprises a collection of models valve 1, . . . valve n, each representing a real-world valve in the water treatment plant. It can be noted that a valve model has attributes such as on state which is indicative of the on/off state of the valve, position which is indicative of whether the valve is open, close or partially open and the like. The valve models do not comprise functions. Asset models can therefore comprise one or more of attributes and functions that model the real-world behavior of the assets they represent.

Figure 8:
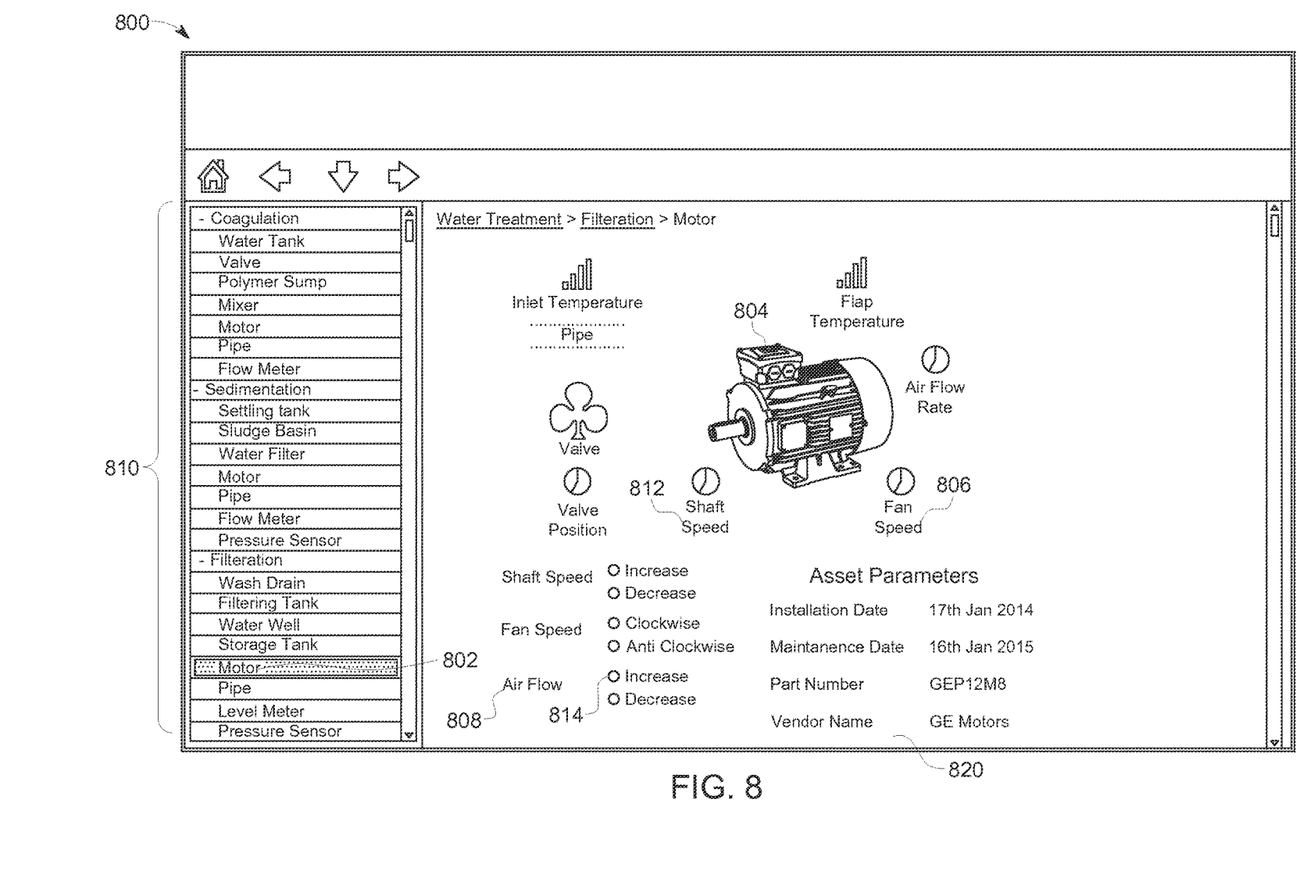
FIG. 8 is an illustration of a HMI screen that is populated from an asset model which is generated in accordance with embodiments described herein.

FIG. 8 is an illustration of a HMI screen 800 generated from a control system model that is developed from one of a structured data or unstructured data in accordance with some embodiments. A number of assets associated with various processes are shown at 810. Information regarding a motor asset 802 from the filtration process is requested via its selection. The various asset attributes or parameters such as fan speed 806, air flow 808 and shaft speed 812 retrieved from the model are shown in the central display area 820. In some embodiments, the corresponding asset image 804 for displaying with the asset data can also be specified in the model. Again, the asset attributes 806, 808, 812 for display in the filtration process can be obtained from the asset model while the live values for the asset attributes can be obtained from the PLC 110. Accordingly, the live values are dynamically updateable. For example, the increase and decrease options 814 for the asset attributes use functions defined in the model to effectuate changes to attributes of the real-world machinery. However, as the screen 800 is generated from an asset model, the HMI application does not need to make multiple requests to the PLC 110 for these values. It can employ the context information from asset model to retrieve all the required parameters from the PLC 110 in a single request.

Figure 9:
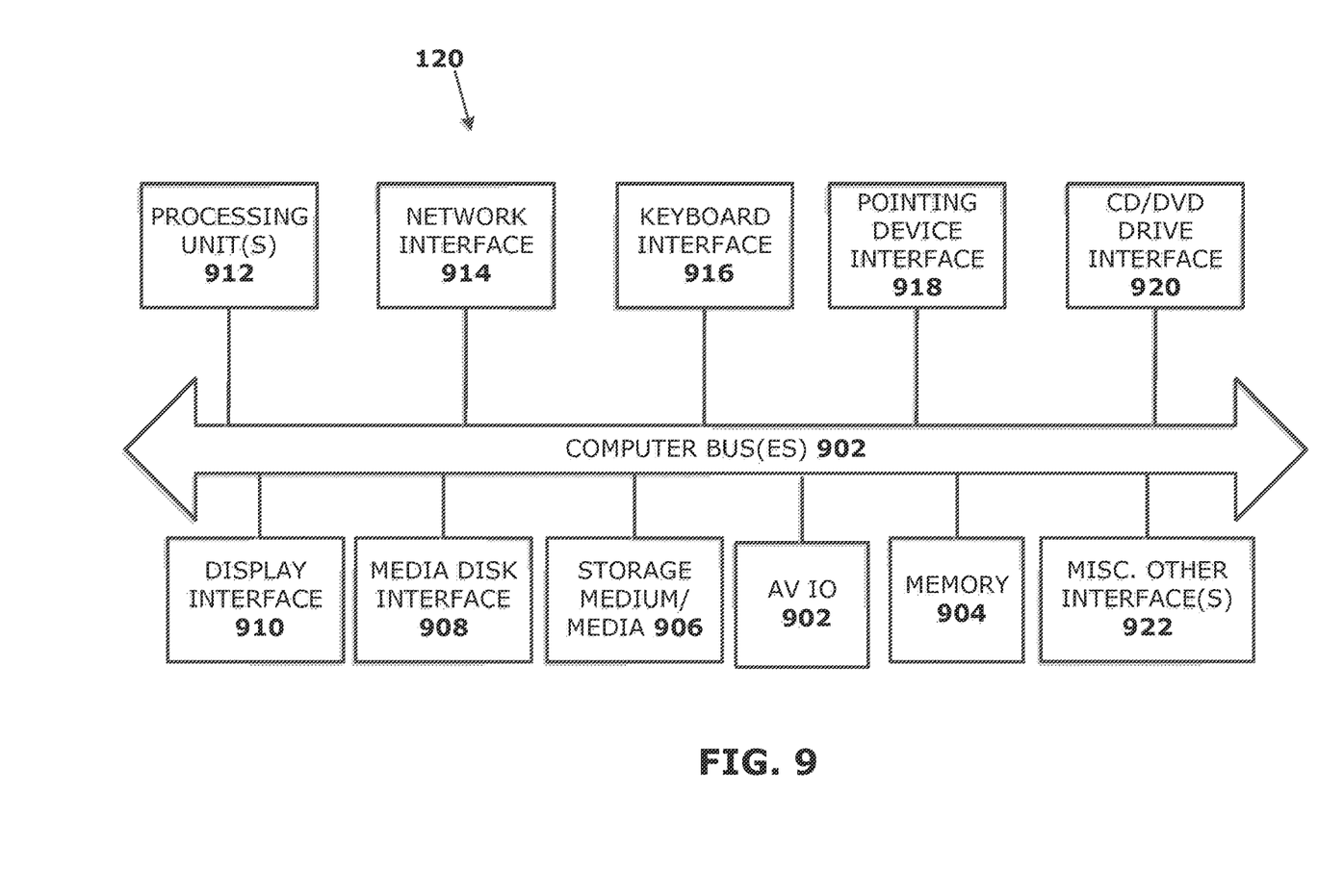
FIG. 9 illustrates the internal architecture of a computing device in accordance with embodiments described herein.

FIG. 9 illustrates the internal architecture of a computing device 120 in accordance with embodiments described herein. It may be appreciated that the internal architecture of the computing device 120 is only provided for better describing the subject matter and that any other computing device currently existing or to be invented can be used to generate or employ a model configuration module 130 described herein. The computing device 120 includes one or more processing units (also referred to herein as CPUs) 912, which interface with at least one computer bus 902. Also interfacing with computer bus 902 are AV 10 interfaces 902 such as a camera, microphone, speakers and the like which receive and provide audio/video data, persistent storage medium/media 906, network interface 914, memory 904, e.g., random access memory (RAM), run-time transient memory, read only memory (ROM), etc., media disk drive interface 908, an interface 920 for a drive that can read and/or write to media including removable media such as floppy, CD-ROM, DVD, etc., media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs such as the model configuration module 130, device drivers, and software modules that comprise program code or logic, and/or computer-executable process steps, incorporating functionality described herein, e.g., one or more of process flows described herein. CPU 912 first loads computer-executable process steps or logic from storage, e.g., memory 904, storage medium/media 906, removable media drive, and/or other storage device. CPU 912 can then execute the stored process steps/logic of the loaded computer-executable process. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise non-transitory computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, program logic, processor-executable instructions, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
   accessing, by a computing device, data stored in a Programmable Logic Controller, the data associated with one or more assets of a control system comprising the Programmable Logic Controller and the data comprising a plurality of data elements;
   determining, by the computing device, if the data is structured data or unstructured data;
   if the data is structured data,
      automatically generating from the data, by the computing device, a model of the control system;
   and,
   if the data is unstructured data,
      receiving, by the computing device, information regarding an asset of the one or more assets that is associated with each of the data elements; and
      generating, by the computing device, a model of the control system based on the received asset information and the data.

2. The method of claim 1, wherein determining if the data is structured data or unstructured data further comprises:
   decomposing, by the computing device, the data elements into respective data components.

3. The method of claim 2, wherein determining if the data is structured data or unstructured data further comprises:
   determining, by the computing device, that the data is structured data if the data components comprise a signal name, an asset generating a signal corresponding to the signal name, a value associated with the signal and an identification of a memory address on the Programmable Logic Controller.

4. The method of claim 2, wherein determining if the data is structured data or unstructured data further comprises:
   determining, by the computing device, that the data is unstructured data if the data components comprise a signal name, a value associated with the signal and an identification of a memory address on the Programmable Logic Controller and the data components do not comprise information regarding an asset generating a signal corresponding to the signal name.

5. The method of claim 1, further comprising:
   storing, by the computing device in a memory, information regarding the generated model in an output file.

6. The method of claim 5, wherein the output file is one of a JSON (JavaScript Object Notation) format, XML (extensible Markup Language) format and a CSV (comma separated values) format.

7. The method of claim 5, further comprising:
   enabling, by the computing device, generation of a HMI (human machine interface) for the control system from the output file.

8. The method of claim 1, the model comprises information regarding asset groups, the one or more assets, attributes of the one or more assets, processes executed by the one or more assets and interactions of the one or more assets.

9. The method of claim 1, wherein receiving, information regarding an asset of the one or more assets associated with each of the data elements if the data is unstructured data further comprises:
   receiving, by the computing device from a user, information regarding an asset of the one or more assets that is associated with each of the data elements of the unstructured data.

10. The method of claim 8, wherein receiving, information regarding an asset associated with each of the data elements if the data is unstructured data further comprises:

receiving, by the computing device from the user, information regarding interactions between the assets associated with the data elements of the unstructured data.

11. A computing device comprising:
a processor;
a storage medium for tangibly storing thereon program logic executable by the processor, the program logic comprising:
data accessing logic that accesses data stored in a Programmable Logic Controller, the data associated with one or more assets of a control system comprising the Programmable Logic Controller and the data comprising a plurality of data elements;
determining logic that determines if the data is structured data or unstructured data;
receiving logic that receives information regarding an asset of the one or more assets that is associated with each of the data elements if the determining logic determines that the data is unstructured data;
model generating logic that automatically generates a model of the control system based on the data if the determining logic determines that the data is structured data, and
the model generating logic generates a model of the control system based on the received asset information and the data if the determining logic determines that the data is unstructured data.

12. The computing device of claim 11, wherein:
each data element of the structured data comprises a signal name, an asset associated with the signal, a current value of the signal and an identification of a memory address on the Programmable Logic Controller comprising the data element and
each data element of the unstructured data comprises a signal name, a current value of the signal and an identification of a memory address on the Programmable Logic Controller comprising the data element and does not comprise information regarding an asset generating a signal corresponding to the signal name.

13. The computing device of claim 11, the program logic further comprising:
decomposing logic that decomposes the data elements into respective data components.

14. The computing device of claim 11, the receiving logic further comprising:
logic that receives from a user, information regarding an asset of the one or more assets associated with each of the data elements of the unstructured data.

15. The computing device of claim 11, the program logic further comprising:
logic that stores information regarding the generated model in an output file.

16. A non-transitory computer-readable storage medium, comprising instructions for:
accessing data stored in a Programmable Logic Controller, the data being associated with one or more assets of a control system comprising the Programmable Logic Controller and the data comprising a plurality of data elements;
determining if the data is structured data or unstructured data;
if the data is structured data, automatically generating from the data, a model of the control system;
and,
if the data is unstructured data,
receiving information regarding an asset of the one or more assets that is associated with each of the data elements; and
generating a model of the control system based on the received asset information and the data.

17. The computer-readable storage medium of claim 16, wherein the instructions for determining if the data is structured data or unstructured data further comprise instructions for:
decomposing the data elements into respective data components.

18. The computer-readable storage medium of claim 16, the instructions for determining if the data is structured data or unstructured data further comprise instructions for:
determining that the data is structured data if each of the data elements comprise a signal name, an asset generating a signal corresponding to the signal name, a value associated with the signal and an identification of a memory address on the Programmable Logic Controller.

19. The computer-readable storage medium of claim 16, the instructions for determining if the data is structured data or unstructured data further comprise instructions for:
determining that the data is unstructured data if each of the data elements comprise a signal name, a value associated with the signal and an identification of a memory address on the Programmable Logic Controller and the data elements do not comprise information regarding an asset generating a signal corresponding to the signal name.

20. The computer-readable storage medium of claim 16, further comprising instructions for:
storing in a memory, information regarding the generated model in an output file.

* * * * *